United States Patent
Thapliya et al.

(10) Patent No.: US 9,218,540 B2
(45) Date of Patent: Dec. 22, 2015

(54) APPARATUS AND COMPUTER READABLE MEDIUM FOR SIGNAL CLASSIFICATION USING SPECTROGRAM AND TEMPLATES

(71) Applicant: FUJI XEROX CO., LTD., Tokyo (JP)

(72) Inventors: Roshan Thapliya, Ebina (JP); Tohru Fuse, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 6 days.

(21) Appl. No.: 13/790,377

(22) Filed: Mar. 8, 2013

(65) Prior Publication Data

US 2014/0079323 A1 Mar. 20, 2014

(30) Foreign Application Priority Data

Sep. 18, 2012 (JP) ................. 2012-204944

(51) Int. Cl.
*G06K 9/62* (2006.01)
*G06K 9/00* (2006.01)

(52) U.S. Cl.
CPC .......... *G06K 9/6202* (2013.01); *G06K 9/00523* (2013.01); *G06K 9/00536* (2013.01)

(58) Field of Classification Search
None
See application file for complete search history.

(56) References Cited

U.S. PATENT DOCUMENTS

| 6,445,822 | B1 | 9/2002 | Crill et al. |
| 6,678,411 | B1 | 1/2004 | Crill |
| 2002/0122595 | A1 | 9/2002 | Crill |
| 2003/0219158 | A1 | 11/2003 | Crill |
| 2005/0192516 | A1* | 9/2005 | Takiguchi et al. ............ 600/595 |
| 2007/0076280 | A1 | 4/2007 | Crill |
| 2011/0116687 | A1* | 5/2011 | McDonald et al. ........... 382/105 |
| 2011/0213612 | A1* | 9/2011 | Zakarauskas ................. 704/233 |

FOREIGN PATENT DOCUMENTS

| JP | A-2003-501755 | 1/2003 |
| JP | A-2007-240552 | 9/2007 |
| JP | A-2011-237865 | 11/2011 |

OTHER PUBLICATIONS

Beeman, K. "Digital signal analysis, editing, and synthesis." Animal acoustic communication. Springer Berlin Heidelberg, 1998. 59-103.*

Russ, John C. The Image Processing Handbook. 6th ed. Chapter 6. Boca Raton: CRC Press, 2011. Web.*

(Continued)

*Primary Examiner* — Chan Park
*Assistant Examiner* — Geoffrey E Summers
(74) *Attorney, Agent, or Firm* — Oliff PLC

(57) ABSTRACT

A classification apparatus includes: a spectrogram generation unit that generates a spectrogram of a time variation signal of a classification object by processing the time variation signal of the classification object obtained by a sensor; a two-dimensional Fourier transform calculation unit that calculates a two-dimensional Fourier transform of the generated spectrogram; a similarity calculation unit that calculates a similarity between an template image and an image of the obtained two-dimensional Fourier transform, for each template image corresponding to each phenomenon stored in the template image memorizing unit; and a determination unit that determines whether the time variation signal of the classification object conforms to any of one or more phenomena, on the basis of the calculated similarity.

5 Claims, 4 Drawing Sheets

(56) References Cited

OTHER PUBLICATIONS

Sabatier, J. M., and A. E. Ekimov. "A review of human signatures in urban environments using seismic and acoustic methods." Technologies for Homeland Security, 2008 IEEE Conference on. IEEE, 2008.*

Chan, Kin-Pong, and AW-C. Fu. "Efficient time series matching by wavelets." Data Engineering, 1999. Proceedings., 15th International Conference on. IEEE, 1999.*

Sabatier et al., "Ultrasonic Methods for Human Motion Detection," *Battlefield Acoustic Sensing for ISR Applications*, 2006, pp. 9-1-9-12, Neuilly-sur-Seine, France: RTO.

* cited by examiner

APPARATUS AND COMPUTER READABLE MEDIUM FOR SIGNAL CLASSIFICATION USING SPECTROGRAM AND TEMPLATES

CROSS-REFERENCE TO RELATED APPLICATIONS

This application is based on and claims priority under 35 USC 119 from Japanese Patent Application No. 2012-204944 filed on Sep. 18, 2012.

BACKGROUND

Technical Field

The present invention relates to a classification apparatus and a non-transitory computer readable medium.

SUMMARY

According to an aspect of the invention, a classification apparatus includes: a template image memorizing unit that stores an image of a two-dimensional Fourier transform of a spectrogram of a time variation signal detected in relation to a phenomenon, as a template image, with regard to each of one or more phenomena; a spectrogram generation unit that generates the spectrogram of the time variation signal of a classification object by processing the time variation signal of the classification object obtained by a sensor; a two-dimensional Fourier transform calculation unit that calculates the two-dimensional Fourier transform of the spectrogram generated by the spectrogram generation unit; a similarity calculation unit that calculates a similarity between the template image and an image of the two-dimensional Fourier transform obtained by the two-dimensional Fourier transform calculation unit, for each template image corresponding to each phenomenon stored in the template image memorizing unit; and a determination unit that determines whether the time variation signal of the classification object conforms to any of one or more phenomena, on the basis of the similarity calculated by the similarity calculation unit.

BRIEF DESCRIPTION OF DRAWINGS

Exemplary embodiment(s) of the present invention will be described in detail based on the following figures, wherein.

DETAILED DESCRIPTION

A classification apparatus according to this exemplary embodiment inputs a signal (hereinafter, referred to as a "time variation signal") which varies on a time basis, analyzes the input signal and thereby determines (that is, classifies the input signal as any one of registration phenomena) whether or not the input signal conforms to any one of the phenomena registered in advance.

The time variation signal of a classification object, for example, is a time-series signal that a sensor outputs over a certain period of time. For example, an audio signal detected by a microphone, an acceleration signal detected by an acceleration sensor, a speed signal obtained by a speed sensor, a pressure signal detected by a pressure sensor and the like are included in an example thereof.

If the phenomenon, which is the classification destination, can be specified by analyzing the time variation signal, any phenomenon may be used. For example, the audio signal that the microphone of a smart phone to be carried with a person picks up is analyzed, and thereby it is considered to analyze which situation the person is in at that time, such as a situation in which the person is walking, waiting for a train at a platform of a station, getting on the train, and the like. Various situations regarding the above examples are examples of the phenomenon of the classification destination.

For this classification, in the present embodiment, a two-dimensional Fourier transform of a spectrogram of an input time variation signal is obtained, and thereby an image which shows a frequency component distribution of the spectrogram is generated. On the other hand, the time variation signal generated in the phenomenon is obtained in advance with regard to each of the various phenomena, the image which displays the frequency component distribution of the spectrogram of the time variation signal is prepared, and the image is stored in a database as a template image corresponding to the phenomenon. Then, according as the image that displays the frequency component distribution of the spectrogram of an input signal is similar to any one of the template images of each phenomenon within the database, which phenomenon the input signal represents is determined.

Here, as well known, the spectrogram represents how a signal spectrum density varies depending on the time, and is a time variation spectrum representation. In general, the spectrogram is represented as a graph (image) representing a signal strength (amplitude) of a certain frequency at a certain period of time using brightness or a color of each point, by setting the time in a horizontal axis and setting the frequency in a vertical axis. In the present embodiment, the spectrogram subjected to the two-dimensional Fourier transform is used in the classification.

Figure 1B:
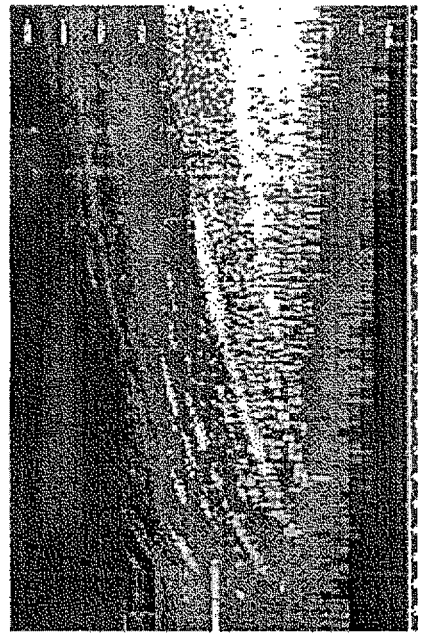
FIGS. 1A to 1D are views illustrating examples of spectrograms generated from audio signals detected in various situations.
Figure 1D:
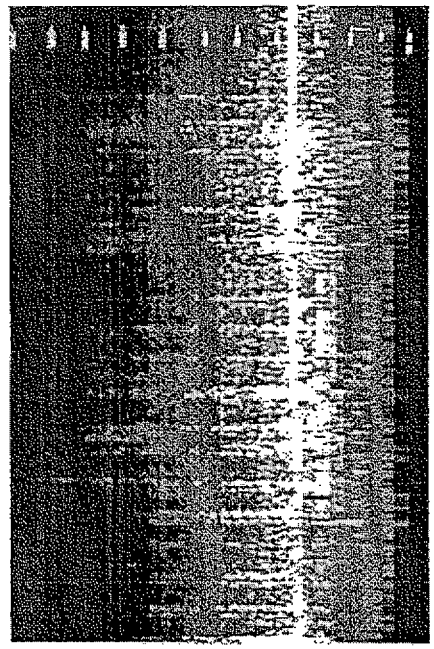
Figure 1A:
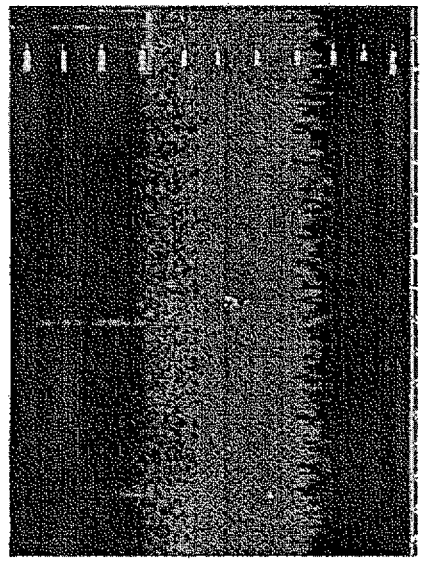
Figure 1C:
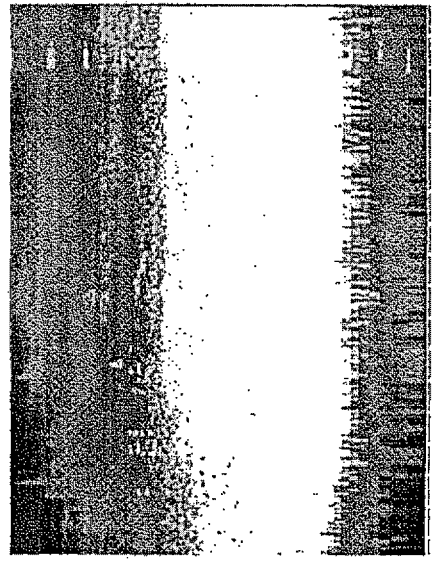

FIGS. 1A to 1D illustrate examples of spectrograms drawn from an audio signal obtained through a microphone of a smart phone carried with a person. FIG. 1A is the spectrogram of the audio signal in a situation where the person is waiting for a train at a station platform. And, FIG. 1B is the spectrogram of the audio signal when the train comes close to the platform where the person is waiting. In addition, FIG. 1C is the spectrogram of the audio signal when the person is on the train which is running outdoors. And, FIG. 1D is the spectrogram of the audio signal when the person is on the train which is running inside a tunnel (or under the ground).

Figure 2A:
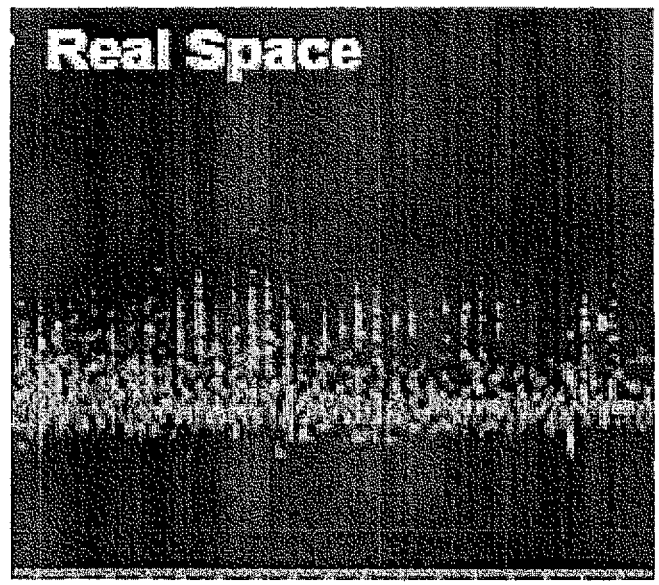
FIGS. 2A and 2B are views illustrating an example of a spectrogram and a two-dimensional Fourier transform of the spectrogram.
Figure 2B:
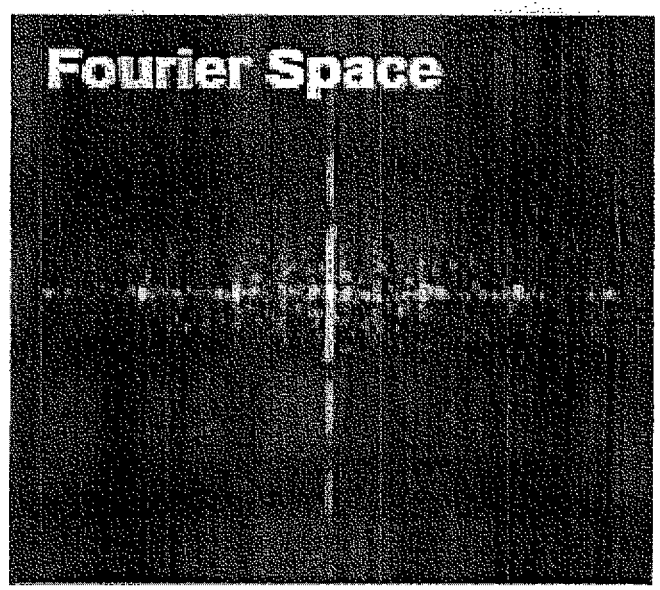

FIG. 2A illustrates the spectrogram generated from the audio signal obtained by the microphone of the smart phone when the person is walking, and FIG. 2B illustrates the two-dimensional Fourier transform of the spectrogram. In the embodiment, for example, the two-dimensional Fourier transform of the spectrogram illustrated in FIG. 2B is stored in the database as the template image, corresponding to a situation (phenomenon) such as "the person is walking".

In addition, it can also be considered that the classification using the above-described template image is combined with a classification using periodicity characteristics which are included in the image of the two-dimensional Fourier transform of the spectrogram.

For example, in the image of the two-dimensional Fourier transform illustrated in FIG. 2B of the spectrogram illustrated in FIG. 2A, points (referred to as "white points") having remarkably higher brightness than that of the periphery thereof are periodically arranged at a constant interval on the horizontal axis which vertically divides the image. The intervals between the white points adjacent to each other in the example are the characteristics which display the periodicity included in the image of the two-dimensional Fourier transform illustrated in FIG. 2B. For example, when the person is walking and running, it is found that in an experiment of the invention that the intervals vary. Thus, in a result where the spectrogram of the signal is subjected to the two-dimensional Fourier transform, when the characteristics as illustrated in FIG. 2B having the periodicity are shown, the classification can be performed by using the characteristics having such periodicity. For example, for each situation (for example walking/running), the interval between the white points on the horizontal axis of the image of the two-dimensional Fourier transform illustrated in FIG. 2B corresponding to the situation is stored in the database as the periodicity characteristics corresponding to the situation, periodicity characteristics similar to the periodicity characteristics obtained by the two-dimensional Fourier transform of the spectrogram of the input signal is searched from the database, and the situation corresponding to the searched periodicity characteristics is determined as the situation displayed by the input signal.

However, such periodicity is not shown with regard to all phenomena (situations). Thus, in the present embodiment, in a case where the periodicity characteristics are shown through the two-dimensional Fourier transform of the spectrogram of the input signal, the classification is performed based on the characteristics. On the other hand, in a case where the periodicity characteristics are not shown, the classification is performed based on a comparison with the template image.

Figure 3:
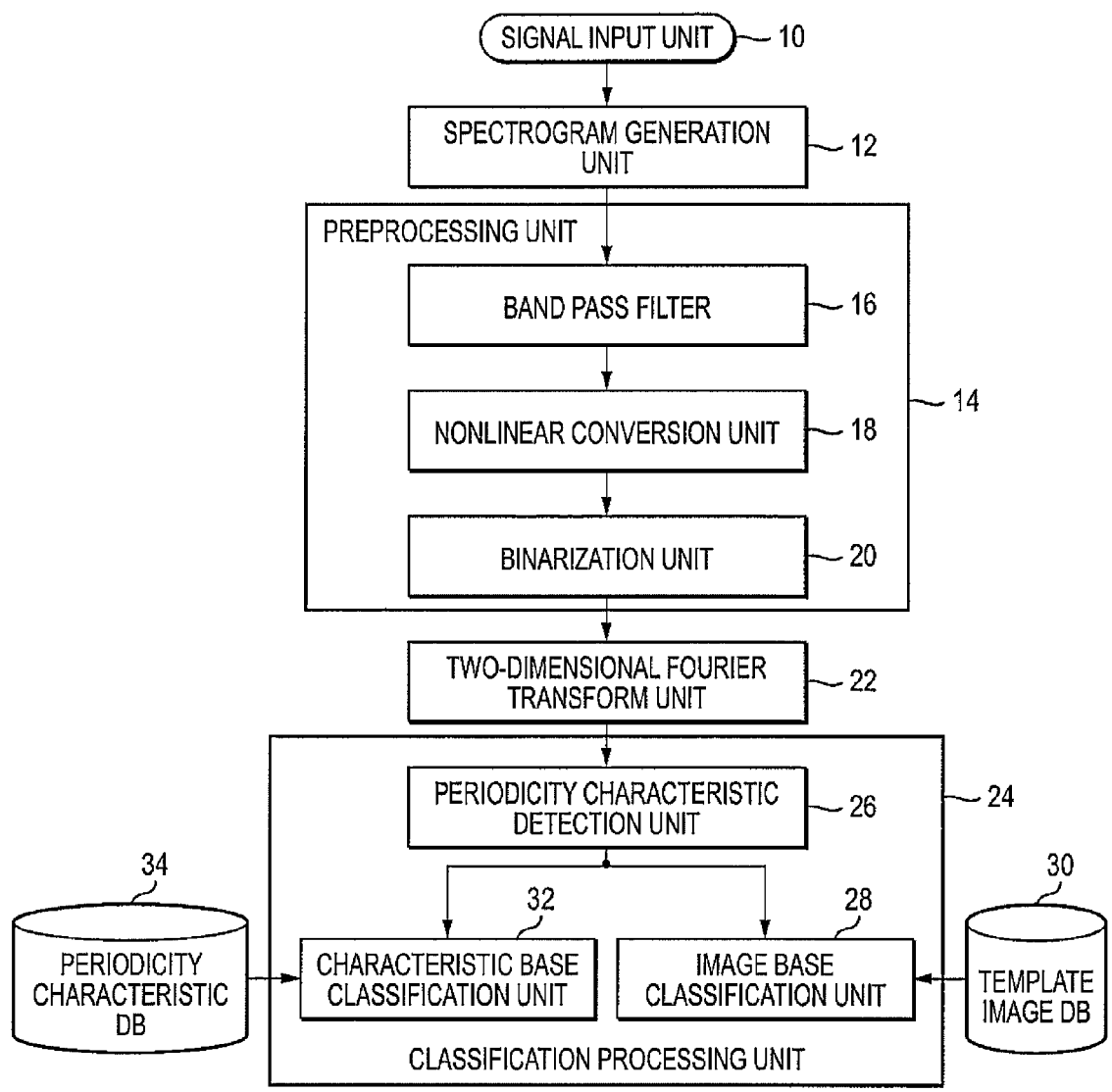
FIG. 3 is a view illustrating an example of an apparatus configuration in an embodiment.

FIG. 3 illustrates an example of a function configuration of a classification apparatus according to the present embodiment.

In the example of FIG. 3, in the template image DB (database) 30, for each phenomenon desired to be classified (for example, a situation of a place where a user with the smart phone stays), the image which is obtained through the two-dimensional Fourier-transform of the spectrogram of the time variation signal which is detected by the sensor with regard to the phenomenon is registered as the template image, corresponding to identification information on the phenomenon. That is, an experiment is performed in advance, a sensor detection signal is collected with regard to various phenomena, the template image is generated from the collected signal, and the generated template image is registered in the template image DB 30. The registered template image is generated by using a spectrogram generation unit 12, a preprocessing unit 14 and a two-dimensional Fourier transform unit 22 (or a device having the same function as this) which are included in the classification apparatus of FIG. 3.

In addition, in a periodicity characteristic DB 34, the periodicity characteristics are registered corresponding to the identification information of the phenomenon, with regard to only the phenomenon in which the periodicity characteristics are shown in the template image. For example, the periodicity characteristics are found by analyzing the template image of each phenomenon prepared when the template image DB 30 is constructed, if the periodicity characteristics are shown, they may be registered in the periodicity characteristic DB 34. For example, as exemplified in FIGS. 2A and 2B, the interval between the white points which are present at an equal interval on the horizontal axis passing through the center of the template image (FIG. 2B is one example thereof) may be used as the periodicity characteristics. In this case, for each phenomenon, a pixel value distribution on the horizontal axis passing through the center of the template image corresponding to the phenomenon is obtained, the white points are extracted by binarizing the pixel value distribution and the like, and the intervals between the white points adjacent to each other among the extracted white point groups are respectively obtained. Then, in a case where the obtained intervals are equal to each other within a predetermined allowable error range, the template image is determined to have the periodicity. Then, a statistical representative value (for example, an average value) of the plural intervals is registered in the periodicity characteristic DB 34 as the periodicity characteristics of the phenomenon. In addition, whether to focus on the periodicity of the white points arranged on the horizontal axis of the template image or whether to use the intervals between such white points as the periodicity characteristics is no more than one example. A method of detecting the periodicity characteristics when obtaining the characteristics registered in the periodicity characteristic DB 34 is the same as that used in a periodicity characteristic detection unit 26 to be described later.

The time variation signal of a classification object is input to a signal input unit 10 of the apparatus according to FIG. 3. For example, for each constant period, an application installed in the smart phone transmits audio signal data that the microphone of the smart phone has picked up during the constant period, to the classification apparatus according to the present embodiment via the interne., and the signal input unit 10 receives the data.

The spectrogram generation unit 12 generates the spectrogram of the time variation signal received by the signal input unit 10. In generating the spectrogram, a method used in the related art may be used. The generated spectrogram can be treated as a type of image.

The generated spectrogram is input to the preprocessing unit 14 and preprocessed for the two-dimensional Fourier transform. The preprocessing unit 14 includes a band pass filter 16, a nonlinear conversion unit 18 and a binarization unit 20.

The band pass filter 16 extracts a predetermined frequency band portion out from the input spectrogram (for example, the horizontal axis represents the time, the vertical axis represents the frequency). This is a process of removing a meaningless frequency band (nothing but a noise) from the spectrogram based on a subsequent analysis. The frequency band to be extracted may be predetermined depending on the characteristics of the signal and the like that the classification apparatus desires to classify.

The nonlinear conversion unit 18 performs a nonlinear amplification with respect to an output (that is, a portion extracted out from the spectrogram) of the band pass filter 16. This is considered to be the same as a gamma correction when the image signal is displayed, a strength is increased by amplifying signal components with a low strength (low brightness), and thereby a signal to noise ratio is intended to be improved.

The binarization unit 20 performs a binarizing process with respect to an output of the nonlinear conversion unit 18. The characteristics of the spectrogram are emphasized by the binarization. The output of the binarization unit 20 is input to the two-dimensional Fourier transform unit 22.

The two-dimensional Fourier transform unit 22 performs the known two-dimensional Fourier transform with respect to an input binarization result (that is, a binarization image obtained by preprocessing the spectrogram of the input signal). As a result, an image displaying a distribution of the frequency components of the binarization image of the spectrogram is obtained. The image (the binarization result) is input to a classification processing unit 24.

The classification processing unit 24 determines whether or not the time variation signal of the classification object conforms to any one of the phenomena registered in the databases (the template image DB 30 and periodicity characteristic DB 34), by using the image of the input two-dimensional Fourier transform result. The classification processing unit 24 includes a periodicity characteristic detection unit 26, an image base classification unit 28 and a characteristic base classification unit 32.

The periodicity characteristic detection unit 26 detects the periodicity characteristics from the image of the input two-dimensional Fourier transform result. The detection method may be the same as the method which obtains the characteristics registered in the above-described periodicity characteristic DB 34.

When the periodicity characteristics are detected by the periodicity characteristic detection unit 26, the classification processing unit 24 performs a classification by using the characteristic base classification unit 32. That is, the characteristic base classification unit 32 finds out the periodicity characteristics close to the periodicity characteristics detected by the periodicity characteristic detection unit 26 from among the periodicity characteristics of each phenomenon registered in the periodicity characteristic DB 34. In the finding, for example, a distance between the detected periodicity characteristics and the periodicity characteristics of the periodicity characteristic DB 34 is obtained, and if the distance is equal to or less than the predetermined threshold value, it may be determined that both of them are "close to each other". For example, in a case where the interval between the white points adjacent to each other is set as the periodicity characteristics as illustrated in the example of FIGS. 2A and 2B, a difference between the interval in the image subjected to the two-dimensional Fourier transform, generated from the signal of classification object, and the interval corresponding to each phenomenon registered in the periodicity characteristic DB 34 is obtained, and the difference is equal to or less than the threshold value, it becomes that both of the intervals are "close to each other". In a case where the periodicity characteristics include multiple components, the periodicity characteristics are regarded as a vector formed of each component, and it may be determined whether or not the distance between the vectors is equal to or less than the threshold value. Then, when such "close" periodicity characteristics are found, the phenomenon corresponding to the found periodicity characteristics is determined as a classification destination of the time variation signal of the classification destination. In a case where multiple periodicity characteristics "close" to the detected periodicity characteristics are found from the periodicity characteristic DB 34, a treatment method may be separately determined. For example, "closest" one out of such plural "close" periodicity characteristics is determined as the classification destination. In a different example, all of such plural "close" periodicity characteristics are determined as the classification destination.

When the periodicity characteristics are detected by the periodicity characteristic detection unit 26 or when the classification destination is not found in the characteristic base classification unit 32, the image base classification unit 28 performs the classification. The image base classification unit 28 compares the input image resulted from the two-dimensional Fourier transform with each template image registered in the template image DB 30, and performs the classification based on the comparison result.

Figure 4:
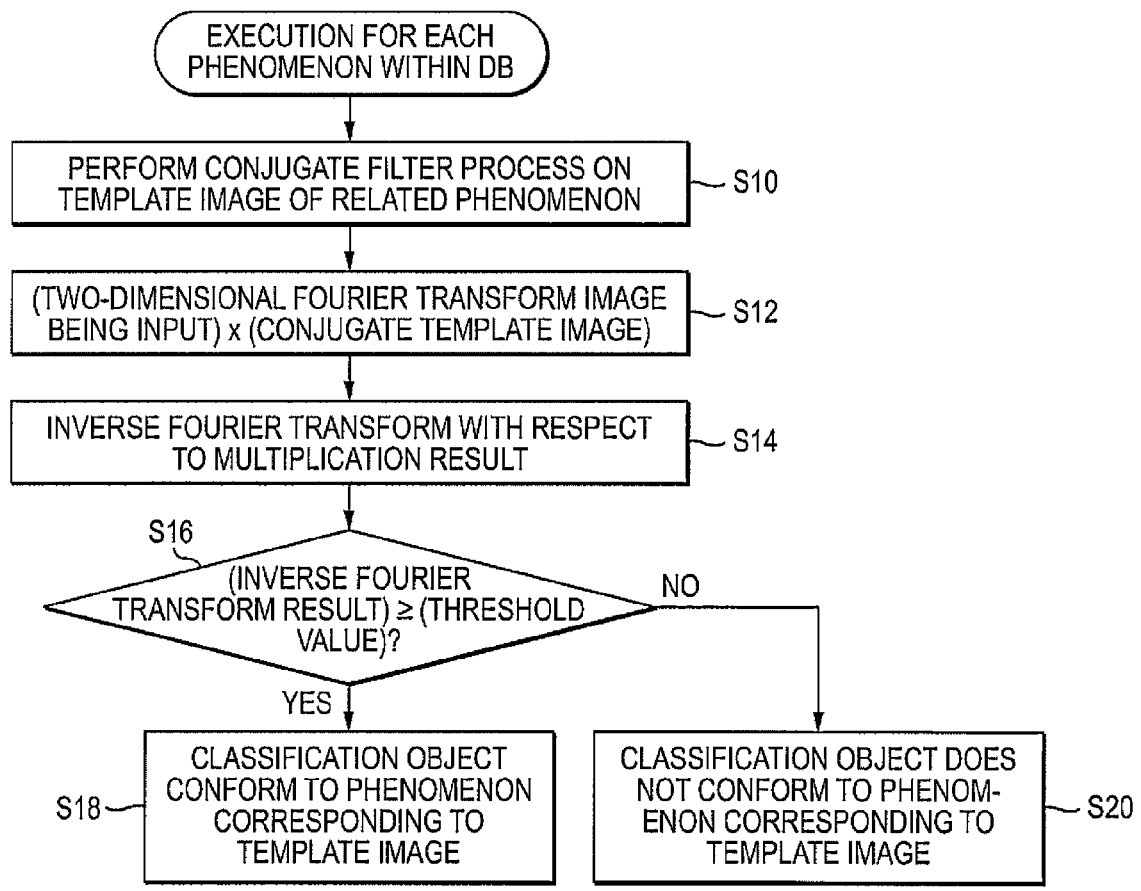
FIG. 4 is a view illustrating an example of a processing sequence of an image base classification unit.

FIG. 4 illustrates an example of a processing sequence of the image base classification unit 28. The processing sequence is executed for each phenomenon (and the template image corresponding to this) registered in the template image DB 30. In the processing sequence, the template image corresponding to a processing object phenomenon is first read from the template image DB 30, and a conjugation filter process is performed to obtain a complex conjugation with respect to the read template image (S10). As a result, a conjugation template image can be obtained. Here, in a case where the conjugation template image is registered with respect to the template image DB 30, S10 is unnecessary. Next, the image resulted from the two-dimensional Fourier transform, input from the two-dimensional Fourier transform unit 22 is multiplied by the conjugation template image (S12). Next, an inverse Fourier transform is performed with respect to the multiplication result (S14). The inverse Fourier transform may be the same calculation as the two-dimensional Fourier transform. The inverse Fourier transform result, based on the relation between the Fourier transform and a mutual correlation function, represents a correlation coefficient between each of the spectrograms before two of the two-dimensional Fourier transforms (the classification object and the template image). The correlation coefficient is compared with the predetermined threshold value (S16). As the comparison result, if the correlation coefficient is equal to or more than the threshold value (that is, the correlation is strong enough), the classification object is determined to conform to the phenomenon corresponding to the template image (that is, the phenomenon is determined to be the classification destination) (S18). If the correlation coefficient is less than the threshold value, the classification object is determined to not conform to the phenomenon corresponding to the template image (that is, the phenomenon is not the classification destination) (S20).

In the example of FIG. 4, all of the phenomena having the correlation coefficient equal to or more than the threshold value are determined to be the classification destination, but alternatively, only the phenomenon having the maximum correlation coefficient among the phenomena having the correlation coefficient equal to or more than the threshold value may be determined to be the classification destination.

As described above, the classification apparatus according to the present embodiment compares the two-dimensional Fourier transform of the spectrogram of the time variation signal of the classification object with the two-dimensional Fourier transform of the spectrogram generated from the signal with regard to each phenomenon (the template image), and thereby the classification destination of the classification object is determined. According to such a configuration, even in a case where an obvious periodicity characteristic cannot be detected through the two-dimensional Fourier transform, the classification can be performed. In addition, in a case where the obvious periodicity characteristics can be detected through the two-dimensional Fourier transform, a relatively large load processing such as comparing images with each other (correlation calculation) is omitted, the classification is performed based on the periodicity characteristics, and thereby a calculation load is reduced. A processing system from the spectrogram generation to the two-dimensional Fourier transform is commonly used in both the classification based on the image comparison and the classification based on the periodicity characteristics, and consequently a simple system configuration is adopted.

For example, such a classification apparatus can analyze whether a situation (this situation is represented by the time variation signal) around a device (for example, a smart phone) on which a time variation signal generating sensor is mounted is relevant to any one of the prescribed situations (phenomena). An application such as controlling the device according to the analysis result, or improving a service to the device by analyzing a trend or the like after accumulating the analysis result may be also considered.

The classification apparatus exemplified above, for example, may be realized by executing a program representing a process of each functional module described above in a general-purpose computer. Here, for example, the computer, as a hardware, includes a circuit configuration in which a microprocessor such as a CPU, a memory (a first memory) such as a random access memory (RAM) and a read only memory (ROM), a HDD controller for controlling a HDD (a hard disk drive), several types of I/O (input and output) interfaces, and a network interface or the like which performs a control for a network connection with a local area network and the like are connected to each other via a bus. In addition, a disk drive for reading and/or writing with respect to a portable disk recording medium such as a CD or a DVD, a memory reader writer and the like for reading and/or writing with respect to a portable nonvolatile recording medium of various standards, such as a flash memory, may be connected with respect to the bus via the I/O interface for example. The program in which processing content for each functional module exemplified above is described is saved in a fixed storage device such as the hard disk drive via the recording medium such as the CD or the DVD, or via communication means such as the network, and installed on the computer. The program stored in the fixed storage device is read by the RAM and executed by the microprocessor such as the CPU, and thereby a functional module group exemplified above is realized. In addition, one or more among the functional modules configuring the classification apparatus may be configured as a hardware circuit.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A classification apparatus comprising:
a memory that stores a phenomenon relating to a situation around a device on which a sensor is mounted and an image of a two-dimensional Fourier transform of a spectrogram of a time variation signal detected in relation to the phenomenon, as a template image, to be associated with each other; and
a processor acting as:
a spectrogram generation unit that generates the spectrogram of the time variation signal of a classification object by processing the time variation signal of the classification object obtained by the sensor;
a two-dimensional Fourier transform calculation unit that calculates the two-dimensional Fourier transform of the spectrogram generated by the spectrogram generation unit;
a similarity calculation unit that calculates a similarity between the template image and an image of the two-dimensional Fourier transform obtained by the two-dimensional Fourier transform calculation unit, for each template image corresponding to each phenomenon stored in the template image memorizing unit;
a determination unit that determines whether the time variation signal of the classification object conforms to any of one or more phenomena, on the basis of the similarity calculated by the similarity calculation unit;
a characteristic memorizing unit that stores periodicity characteristics included in the two-dimensional Fourier transform of the spectrogram of the time variation signal detected in relation to the phenomenon, as a template characteristics, with regard to each of one or more phenomena;
a characteristic detection unit that detects the periodicity characteristics from an image of the two-dimensional Fourier transform obtained by the two-dimensional Fourier transform calculation unit; and
a specification unit that specifies one similar to the periodicity characteristics detected by the characteristic detection unit, from among the template characteristics stored in the characteristic memorizing unit,
wherein the determination unit determines that the time variation signal of the classification object conforms to the phenomenon corresponding to the template characteristics specified by the specification unit, in a case where the template characteristics similar to the periodicity characteristics detected by the characteristic detection unit is specified by the specification unit, and
wherein in a case where the template characteristics similar to the periodicity characteristics detected by the characteristic detection unit is not specified by the specification unit, the similarity calculation is performed by the similarity calculation unit.

2. The classification apparatus according to claim 1, wherein
the characteristic detection unit obtains from the image of the two-dimensional Fourier transform obtained by the two-dimensional Fourier transform calculation unit a pixel value distribution on a horizontal axis passing through a center of the image and extracts white points based on the pixel value distribution so as to obtain intervals between the white points adjacent to each other.

3. The classification apparatus according to claim 1,
wherein the time variation signal of the classification object is one of an audio signal, an acceleration signal or a pressure signal.

4. A non-transitory computer readable medium storing a program causing a computer to execute a process for classification, the process comprising:
storing a phenomenon relating to a situation around a device on which a sensor is mounted and an image of a two-dimensional Fourier transform of a spectrogram of a time variation signal detected in relation to the phenomenon, as a template image, to be associated with each other;
generating the spectrogram of the time variation signal of a classification object by processing the time variation signal of the classification object obtained by the sensor;

calculating the two-dimensional Fourier transform of the generated spectrogram;

calculating a similarity between the template image and an image of the obtained two-dimensional Fourier transform, for each template image corresponding to each stored phenomenon;

determining whether the time variation signal of the classification object conforms to any of one or more phenomena, on the basis of the calculated similarity;

storing periodicity characteristics included in the two-dimensional Fourier transform of the spectrogram of the time variation signal detected in relation to the phenomenon, as a template characteristics. with regard to each of one or more phenomena;

detecting the periodicity characteristics from an image of the two-dimensional Fourier transform obtained by the calculating the two-dimensional Fourier transform of the generated spectrogram; and specifying one similar to the periodicity characteristics detected detecting, from among the template characteristics stored by the storing, wherein the determining determines that the time variation signal of the classification object conforms to the phenomenon corresponding to the template characteristics specified by the specifying, in a case where the template characteristics similar to the periodicity characteristics detected by the detecting is specified by the specifying, and wherein in a case where the template characteristics similar to the periodicity characteristics detected by the detecting is not specified by the specifying, the similarity calculation is performed by the calculating of the similarity between the template image and an image of the obtained two-dimensional Fourier transform.

5. The non-transitory computer readable medium according to claim 4, wherein the time variation signal of the classification object is one of an audio signal, an acceleration signal or a pressure signal.

* * * * *